March 17, 1953 J. A. PILGRIM 2,631,388
STUMP CLEARING DEVICE
Filed Oct. 5, 1950 2 SHEETS—SHEET 1
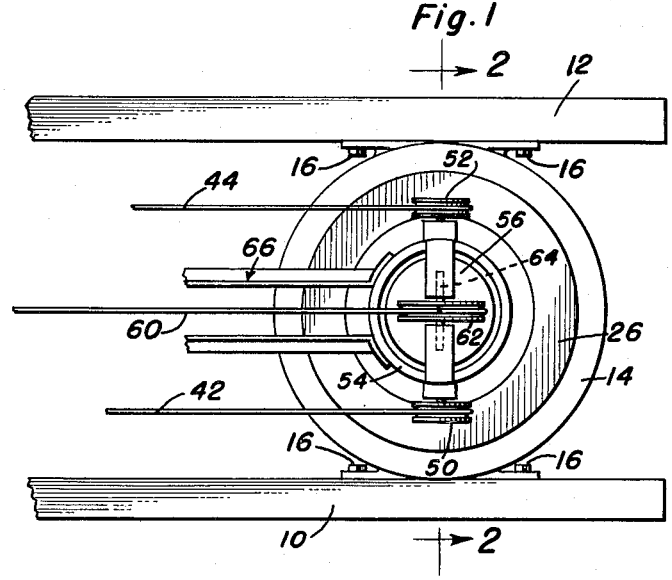
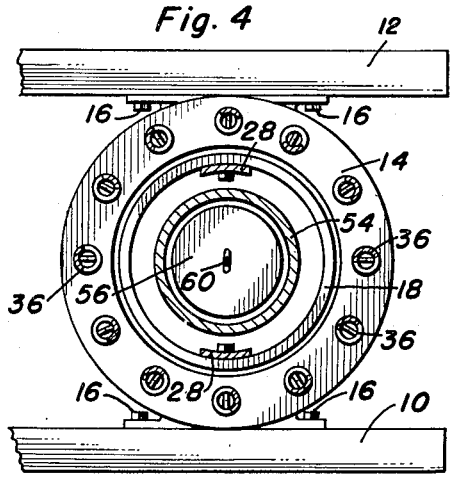
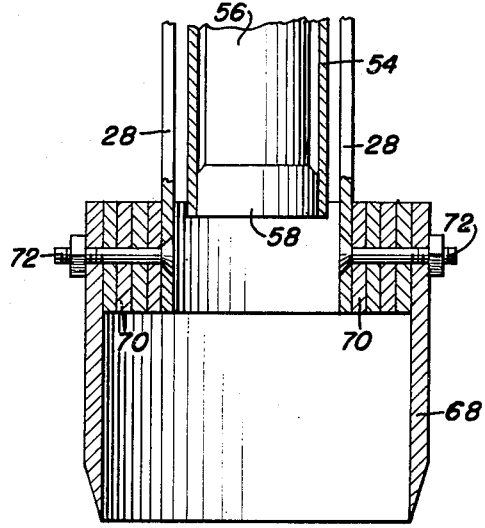
Joseph A. Pilgrim
INVENTOR.

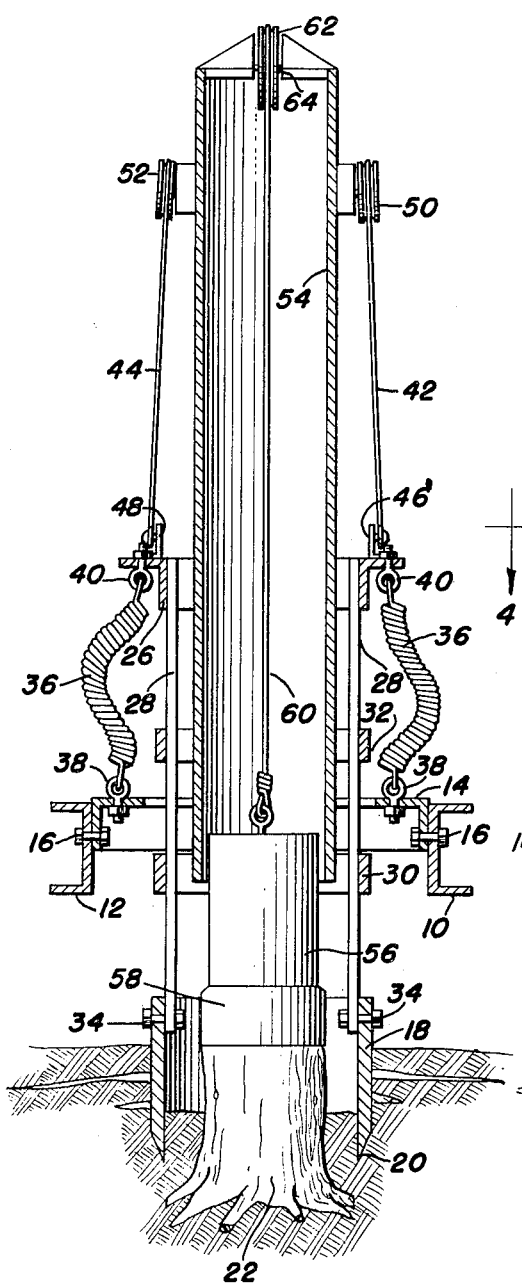
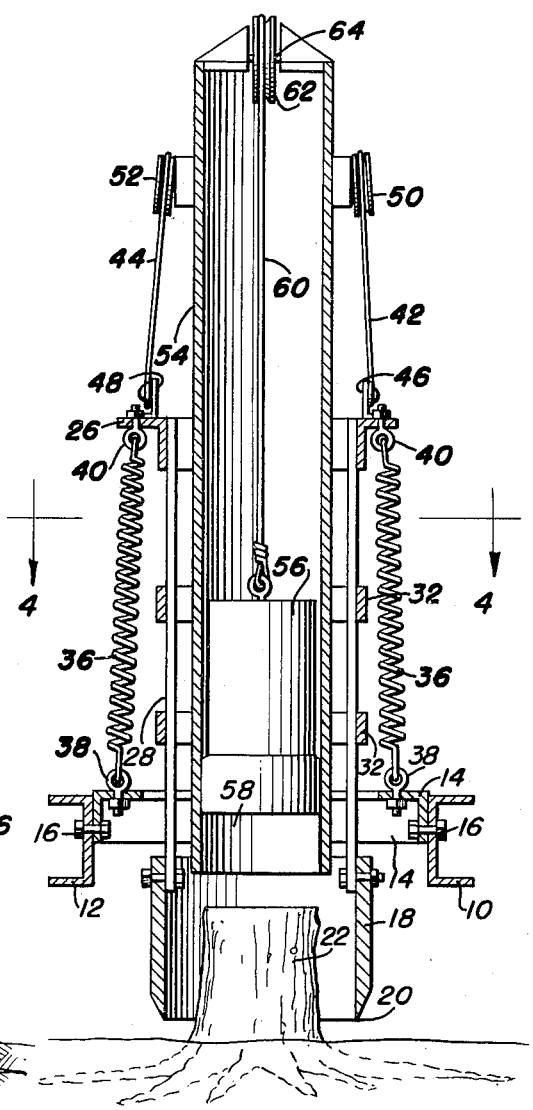

Patented Mar. 17, 1953

2,631,388

UNITED STATES PATENT OFFICE 2,631,388

STUMP CLEARING DEVICE

Joseph A. Pilgrim, Elberta, Ala.

Application October 5, 1950, Serial No. 188,593

5 Claims. (Cl. 37—2)

This is a continuation-in-part of my copending application, Serial No. 101,138, which was filed on June 24, 1949, and which is now Patent No. 2,530,399 dated November 21, 1950.

An object of this invention is to provide a device for cutting the laterally extending roots of a tree stump while the stump is still in the ground, and for driving the stump into the ground below or at least to a position with the grade line, whereby stumps are eliminated without the necessity of blasting them out or pulling them out of the ground.

Ancillary objects and features of importance will become apparent in following the description of the illustrated forms of the invention.

In the drawings:

Figure 1 is a top view of the device showing it attached to a fragmentary part of a typical tractor;

Figure 2 is a longitudinal sectional view taken substantially on the line 2—2 of Figure 1 in the direction of the arrows;

Figure 3 is a longitudinal sectional view somewhat similar to that shown in Figure 2 but illustrating a different position of the elements;

Figure 4 is a transverse view taken on the line 4—4 of Figure 2 and in the direction of the arrows; and Figure 5 is a fragmentary sectional view showing a slightly modified form of the invention, that is, illustrating that it is possible to use a cutter of a larger diameter when the situation warrants the same.

As pointed out in my copending application, stump elimination is a problem. Various ways have been adopted for removing stumps, for example, blasting or pulling either by a special apparatus or by the use of a bulldozer. In the instant device, the stumps are eliminated, not by the removal from the ground, but by driving them sufficiently far into the ground so that they do not objectionably protrude above the grade line.

In Figure 1, I have illustrated frame members 10 and 12 which are typical of various types of tractors and which are purely conventional elements selected in view of their convenience. A frame 14 is bolted, as at 16, or otherwise rigidly fixed to the members 10 and 12. This frame may be of angle iron construction and of circular form and is actually preferably of this construction. There is a cutter 18 of cylindrical shape having a rather sharp cutting edge 20 at the lower circumference thereof. This cutter is designed for the purpose of shearing the laterally projecting roots from a typical tree stump.

There is a means attached to the cutter 18 for lifting the cutter so that it may be forcibly lowered in encircling relationship with the stump 22 by the pull of gravity as aided by one or more springs. This means consists of a support which is made from an angle construction collar 26 having rods 28 depending therefrom, the rods being held in assembly by means of bracing collars 30 and 32. The lower ends of the rods are fixed to the cutter 18 by any suitable means, for example, the bolts 34 which have appropriate nuts thereon.

There is a plurality of said springs 36 used to oppose the lifting operation of the cutter 18. The springs are secured by means of the eyes 38 to the frame 14 and are secured to the collar 26 by means of eyes 40.

In operation, the cables 42 and 44 which are attached to the brackets 46 and 48, fixed to the angle construction collar 26, are pulled, the collar 26, the rods 28 and hence the cutter 18 are lifted, and at the same time the springs 36 are stretched inasmuch as the lower ends are fixed to the frame 14 and the upper ends thereof are fixed to the collar 26. When the pulling force on the cables 42 and 44 is released, the cutter 18 is gravity-lowered and is also lowered by the stored energy of the springs 36.

The cables 42 and 44 are attached to standard tractor components of purely conventional description and are guided appropriately, as, for example, by the guide elements 50 and 52 which are fixed to the hammer guide 54. The guide elements 50 and 52 are standard pulleys mounted on standard shafts.

The hammer guide 54 is provided with a vertically operable hammer or weighted member 56 which has a head 58 at its lower end. There is a flexible element, for example, the cable 60, fixed to the hammer 56 and entrained around a guide pulley 62. This guide pulley is mounted on a shaft 64 carried at the upper open end of the hammer guide 54 and is adapted to connect with a standard winding assembly on a tractor, for example, a winch or power take-off.

In order to hold the hammer guide or tube 54 vertical, the supporting boom 66 which is fixed to the guide 54 is employed. In operation of this portion of the device, the hammer 56 is lifted by its lifting means 60. Then it is allowed to fall freely, whereby, upon striking the top of the stump 22, the stump is driven into the ground. This operation is continued until such time that the stump is lowered the necessary or desired amount.

The actuation of the cutter 18 and the hammer 56 is suggested as being sequential. In other words, first the laterally extending roots of the stump 22 should be cut. Thereafter, either before or after the cutter 18 is lifted from the ground, the hammer 56 is set into operation either one or more times, depending upon the necessities. Then, the device is ready to be moved, for example, by operating the tractor to another place so as to start operations on the next stump.

The cutter 18 may be removed in favor of a larger or smaller one. When a smaller one is used, it is suggested that the outer circumference thereof be disposed between the rods 28. When a larger cutter is used, for example, as disclosed in Figure 5, it is suggested that it be attached to the cutter lifting means by employing a number of spacers 70 which may be in the form of rings or washers. Bolts 72, longer than the bolts 34, have to be employed.

Having described the invention, what is claimed as new is:

1. A device for cutting a stump loose from its roots and driving the stump into the ground comprising a portable frame for positioning over the stump in centered relation thereto, an upright rigidly mounted tube depending into the center of said frame for vertical alignment with said stump, a hammer vertically slidable in said tube for raising and releasing to descend by gravity against the top of the stump for driving the stump into the ground, a tubular cutter coaxial with said tube and adapted to be raised and released for independent downward movement into the ground in surrounding relation to said stump to sever the roots and free the stump therefrom for driving by said hammer, means for raising and releasing said hammer, means for raising and releasing said cutter, and means for driving said cutter downwardly when released.

2. A device according to claim 1, the second named means comprising a vertically movable collar surrounding said tube, operating connections between said collar and cutter, and pulley supported pull cables connected to said collar to raise the same.

3. A device according to claim 1, said second named means comprising a vertically movable collar surrounding said tube, rods suspending said cutter from said collar, and pulley supported cables connected to said collar to raise the same.

4. A device according to claim 1, said second named means comprising a vertically movable collar surrounding said tube, operating connections between said collar and cutter, and pulley supported pull cables connected to said collar to raise the same, said last named means including tension springs connected to said frame and collar.

5. A device according to claim 1, said second named means comprising a vertically movable collar surrounding said tube, said last named means comprising tension springs connected to said frame and collar.

JOSEPH A. PILGRIM.

REFERENCES CITED

The following references are of record in the file of this patent:

UNITED STATES PATENTS

| Number | Name | Date |
|---|---|---|
| 711,013 | Sooysmith | Oct. 14, 1902 |
| 722,559 | Bond | Mar. 10, 1903 |
| 947,391 | Michael | Jan. 25, 1910 |
| 1,692,436 | Deane | Nov. 20, 1928 |
| 2,225,765 | Brice | Dec. 24, 1940 |
| 2,530,399 | Pilgrim | Nov. 21, 1950 |